(12) United States Patent
Birmingham et al.

(10) Patent No.: US 6,251,168 B1
(45) Date of Patent: Jun. 26, 2001

(54) HIGH EFFICIENCY GAS SCRUBBER USING COMBINED COALESCING MEDIA AND CENTRIFUGAL CYCLONE

(75) Inventors: Daniel P. Birmingham; Gregory C. Rush, both of Stark County, OH (US)

(73) Assignees: Hudson Products Corporation, Houston, TX (US); McDermott Technology, Inc., New Orleans, LA (US)

( * ) Notice: Subject to any disclaimer, the term of this patent is extended or adjusted under 35 U.S.C. 154(b) by 0 days.

(21) Appl. No.: 09/360,200

(22) Filed: Jul. 23, 1999

(51) Int. Cl.[7] .................................................. B01D 45/14
(52) U.S. Cl. ........................ 95/268; 95/269; 95/287; 55/330; 55/337
(58) Field of Search .................... 95/268, 269, 286, 95/287; 55/318, 320, 323, 330–333, 337, 459.1

(56) References Cited

U.S. PATENT DOCUMENTS

| | | | |
|---|---|---|---|
| 2,970,671 | * 2/1961 | Warner | 55/337 X |
| 3,016,345 | * 1/1962 | Price | 95/287 X |
| 3,066,462 | * 12/1962 | Yap et al. | 95/287 |
| 3,216,182 | * 11/1965 | Cochran et al. | 55/337 X |
| 3,324,634 | * 6/1967 | Brahler et al. | 55/337 |
| 3,339,349 | * 9/1967 | Farnum | 55/320 X |
| 3,339,350 | * 9/1967 | Sims | 55/320 |
| 3,386,230 | * 6/1968 | Riesberg et al. | 55/337 |
| 3,707,068 | * 12/1972 | Bloom | 55/337 |
| 3,834,126 | * 9/1974 | DiMinno, Jr. | 55/323 X |
| 4,189,310 | * 2/1980 | Hotta | 55/323 X |
| 4,316,726 | * 2/1982 | Hopper | 95/268 X |
| 4,443,233 | * 4/1984 | Moran | 95/268 |
| 4,648,890 | * 3/1987 | Kidwell et al. | 55/347 |
| 4,666,473 | * 5/1987 | Gerdau | 95/268 |
| 4,692,175 | * 9/1987 | Frantz | 55/323 X |
| 4,767,424 | * 8/1988 | McEwan | 55/337 X |
| 4,818,257 | * 4/1989 | Kennedy et al. | 95/286 |
| 4,838,903 | * 6/1989 | Thomaides et al. | 95/286 |
| 4,865,629 | * 9/1989 | Zievers et al. | 95/268 |
| 4,948,398 | * 8/1990 | Thomaides et al. | 95/286 |
| 4,982,794 | * 1/1991 | Houot | 166/357 |
| 5,248,323 | * 9/1993 | Stevenson | 95/268 X |
| 5,795,369 | * 8/1998 | Taub | 95/286 X |

FOREIGN PATENT DOCUMENTS

0824832 * 12/1959 (GB) .................................... 55/318

* cited by examiner

*Primary Examiner*—Robert H. Spitzer
(74) *Attorney, Agent, or Firm*—R. C. Baraona; Eric Marich

(57) ABSTRACT

A high-efficiency secondary cyclone separator used in combination with a high-efficiency primary separator produces a gas stream having low liquid content in gas for a feed stream having either a high or low liquid loading. A high surface area to volume coalescing material is combined with the secondary cyclone separator to create a more efficient gas-oil centrifugal separator system.

13 Claims, 3 Drawing Sheets

US 6,251,168 B1

HIGH EFFICIENCY GAS SCRUBBER USING COMBINED COALESCING MEDIA AND CENTRIFUGAL CYCLONE

CROSS REFERENCE TO RELATED APPLICATIONS

Reference is made to the U.S. patent application Ser. No. 08/695,947 filed Aug. 13, 1996, titled COMPACT, HIGH-EFFICIENCY GAS/LIQUID SEPARATOR METHOD AND APPARATUS, which is a continuation of U.S. patent application Ser. No. 08/337,359 filed Nov. 10, 1994, now abandoned; and U.S. patent application Ser. No. 09/072,037 filed May 4, 1998, titled COMPACT GAS LIQUID SEPARATION SYSTEM WITH REAL TIME PERFORMANCE MONITORING, now U.S. Pat. No. 6,004,385, are incorporated herein by reference as though fully set forth herein.

FIELD AND BACKGROUND OF THE INVENTION

The present invention relates, in general, to oil and gas separation systems and, in particular, to an improved, unique, and useful method and apparatus for separating a multiple phase mixture into separate vapor and liquid phases utilizing single or multiple pairs of centrifugal force separators in conjunction with a coalescing media. The present invention is particularly well-suited for applications involving the separation of oil and gas phases contained in wellhead fluids, obtained from hydrocarbon production systems, and can be employed in any hydrocarbon production facility, including topside or subsea locations.

Many problems which are unique to hydrocarbon production systems, such as foaming, emulsions, intermittent flows, waxing, and hydrates, are encountered when separating the liquid and gas phases of wellhead fluids. Such wellhead fluids typically comprise one or more of the following: hydrocarbon liquid(s), hydrocarbon gas(es), water, sand, and/or other solids or gases (including carbon dioxide and/or hydrogen sulfide which, in small quantities, do not affect the separation process but, based on their corrosive nature, do influence the choice of construction materials for gas-oil separators). Also, wellhead fluids typically have multiple components—that is, the specific type and number of hydrocarbons encountered may vary (i.e., methane ethane, propane, etc.), such that the pressure and temperature of the wellhead fluid determines whether the particular hydrocarbon in question is a liquid or a vapor. Likewise, the distribution and quantity of the various components determines the gravity of the oil and the gas.

In comparison to a one-component, two-phase system (such as a steam-water mix), wellhead fluids present other unique separation problems because of the large number of possible combinations of particular gases, liquids, and solids contained in a specific wellhead fluid. Essentially, each particular wellhead fluid will have a unique set of fluid properties which can only be approximated by knowing the pressure, temperature, liquid gravity, and gas gravity of that fluid. Furthermore, if the wellhead fluid contains hydrocarbons and water, the resulting emulsions may impact separator performance in such a way that is not seen in one-component, two-phase systems.

Accordingly, it is common practice to separate the phases in a wellhead fluid. The *Petroleum Engineering Handbook*, Society of Petroleum Engineers, $3^{rd}$ printing, (1992), recommends that the oil content of the gas discharged by an oil and gas separator should be in the range of 0.10 gallons per million standard cubic feet (Gal/MMscf) to 1.0 Gal/MMscf, as a commercially accepted standard of the performance under normal or average conditions for gas-liquid separators in hydrocarbon production systems.

Current gas-liquid separators for wellhead fluids can be classified in two general categories. The first class of separators rely on natural separation, also known as gravity separation. These systems require large vessels to achieve the desired separation performance. When natural separation is attempted in a relatively small vessel, the throughput, or vapor flux, of that system is significantly smaller when compared to other systems not relying on natural separation. An example of such a system is described in U.S. Pat. No. 4,982,794.

The second type of wellhead fluid separators are generally defined as centrifugal separators. These separators rely on centrifugal force to achieve the desired separation performance. In this arrangement, the separation efficiency of such a separator may be sensitive to small changes in flow, and it may require relatively larger pressure drops to create the centrifugal force. See, *Surface Production Operations, Volume 1, Design of Oil-Handling Systems and Facilities,* Ken Arnold and Maurice Stewart, Gulf Publishing Company. Therefore, cyclone separators are not commonly used in hydrocarbon production systems.

A typical cyclone separator 10 is shown in FIGS. 1A and 1B. In this separator design, gas with entrained liquid oil droplets from the primary separator (not pictured) enters the cyclone through multiple inlets 45 created by inlet vanes 40 which are arranged tangential to the inside can 30 of the cyclone 10. This inlet arrangement imparts a swirl on the incoming fluids causing the heavier liquid droplets to move in a radial outward direction towards the wall 30 of the cyclone while the lighter gas phase flows upward through the center of the cyclone. The liquid forms a film on the inner wall 30 of the cyclone and is removed through skimmer slots in the wall of the cyclone 10.

Typically, when separator 10 is used in combination with a certain primary separator, the resulting gas-liquid centrifugal separator system can remove over 99% of the incoming liquids from the feed stream. Significantly, the ability of this separator system to meet the oil content in gas specification is limited by separator 10, the secondary cyclone separator. While this separated gas is sufficiently free of liquids for use in some separation applications, the gas quality may not satisfy the oil content in gas specification mentioned above, particularly at high liquid loads (i.e., a feed stream with a liquid volume greater than 15%). An example of a gas-liquid centrifugal separator system which utilizes a secondary cyclone is illustrated by co-pending U.S. application Ser. No. 08/695,947, titled "Compact, High-Efficiency Gas/Liquid Separator Method and Apparatus."

The performance of the secondary cyclone separator is strongly dependent upon two factors. The first factor is the size of the liquid drops entering the cyclone. Droplet carryover occurs when there is insufficient residence time inside the cyclone for the drop to move the radial distance across the cyclone where it becomes separated from the core gas stream. This problem is more acute for small droplets, since small droplets prefer to remain with the core gas stream. A second mechanism that limits the liquid carryover performance of the secondary cyclone separator is re-entrainment from the liquid film on the radial wall of the cyclone. When the feed stream contains a high liquid load, the liquid entering the secondary cyclone may form a relatively thick film on the inner wall of the cyclone. The upward flowing gas can re-entrain liquids from this film before its removal from the cyclone, which can cause a significant liquid carryover under high liquid load conditions.

While the components of the above-described gas-liquid separator system are similar to steam-water separators used in power generation applications, such as U.S. Pat. No. 4,648,890 to Kidwell or U.S. Pat. No. 3,324,634 to Brahler (both assigned at issue to the Babcock & Wilcox Company), substantial differences between the fluid properties of gas/oil wellhead fluids and water/steam mixtures make these systems markedly different. In addition to the unique problems caused by gas-liquid wellhead fluids discussed above, the fluid properties of steam-water mixtures varies significantly from that of gas-liquid wellhead fluids such that the droplet entrainment tendencies, centrifugal separation tendencies, and vapor carry under tendencies of each system are also different. Accordingly, while use of gas scrubbers (systems which separate gas-oil with low liquid loading) has been known, the development and use of a gas-oil centrifugal separator system for hydrocarbon production systems with high liquid loading was not previously envisioned or expected to be feasible by those skilled in the art.

In gas scrubbers, separation efficiency is limited by the size of droplets entering the cyclone, with the larger liquid droplets being more susceptible to separation via centrifugal force than smaller droplets. However, none of the prior art gas scrubbers described above include a means for reliably controlling or enhancing droplet size. Moreover, the setup and operation of these systems are limited by the pressure drop requirement and low tolerances for flow rate changes discussed above. Thus, a gas-oil centrifugal separation system which overcomes these limitations would be welcome.

Finally, the performance and requirements for oil and gas separators must be examined in light of the economic benefits of minimizing the space and weight requirements for such equipment on offshore platforms. Consequently, it is desirable to develop a separator that is smaller than a natural separator, but which performs within the limits specified above.

SUMMARY OF THE INVENTION

It is an object of the present invention to provide a gas-liquid separator system from hydrocarbon production systems which overcomes the problems of other known separator systems.

It is a further object of the invention to provide a second stage cyclone separator which reliably reduces droplet carryover, especially in high load situations, to produce a gas quality meeting current recognized standards by utilizing a pre-conditioning means which maximizes surface contact and droplet-to-droplet impact, while still achieving acceptable pressure drop criteria.

Another object of this invention is to provide a high-efficiency secondary cyclone separator which, when used in combination with a high-efficiency primary separator, will produce a gas stream having low liquid content in gas for a feed stream, with either high or low liquid loading, by utilizing a pre-conditioning means which maximizes surface contact and droplet-to-droplet impact while still achieving acceptable pressure drop criteria.

It is a further object of this invention to improve the reliability and efficiency of current cyclone systems by utilizing a solid surface to coalesce small droplets into larger droplets and/or produce surface films.

Accordingly, a high surface area to volume coalescing material is combined with the secondary cyclone separator to create a more efficient and reliable cyclone separator. In one embodiment of the separator, the coalescing material pre-conditions the fluid stream entering the secondary cyclone separator such that the centrifugal separation mechanism in the cyclone is enhanced. When used in combination with a high-efficiency primary separator, the overall liquid removal efficiency of the gas-liquid separator is improved.

In a second embodiment, the gas stream is passed through the coalescing material more than once. The first pass provides a pre-separation of the entrained droplets from the gas stream, while the subsequent pass provides droplet growth that enhances the centrifugal separation mechanism in the cyclone. Again, when used in combination with a primary separator, the reliability and liquid removal efficiency of the gas-liquid separator is increased and its useful operating range is extended.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1A:
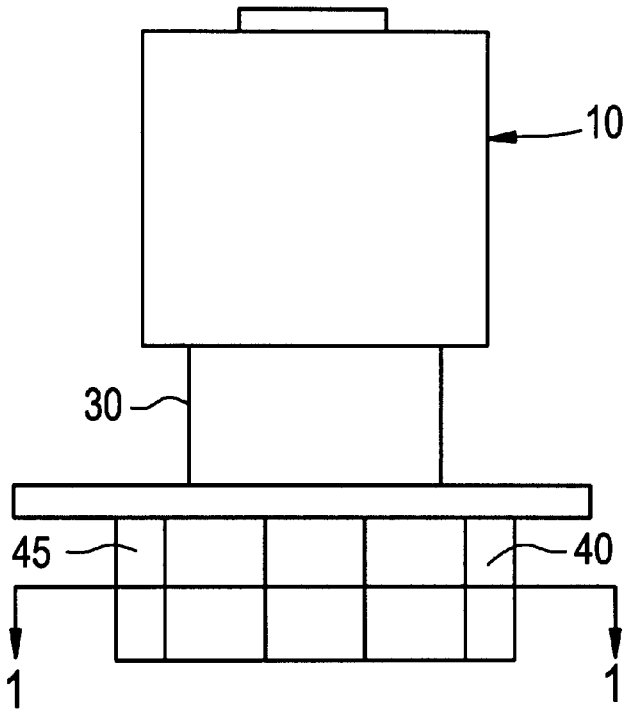
FIG. 1A is a side elevational view of a prior art cyclone separator.
Figure 1B:
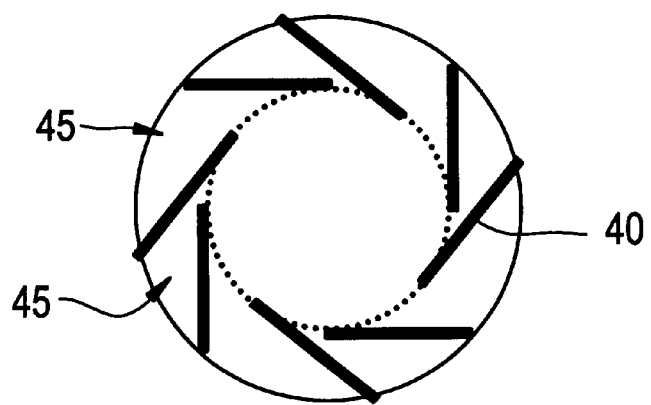
FIG. 1B is a sectional top plan view of the cyclone separator of FIG. 1A taken along line 1—1.
Figure 2A:
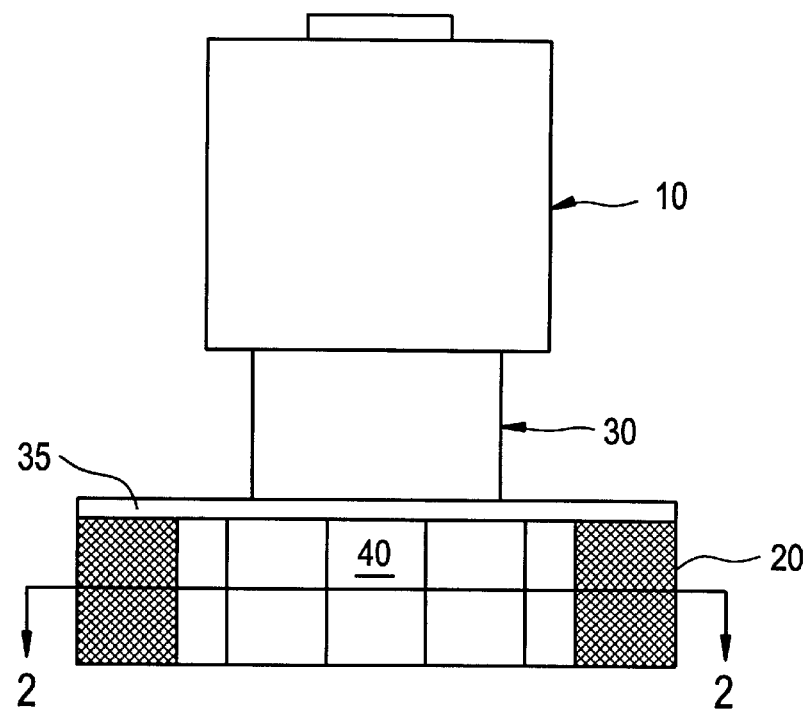
FIG. 2A is a side elevational view of a second stage cyclone separator according to the invention.
Figure 2B:
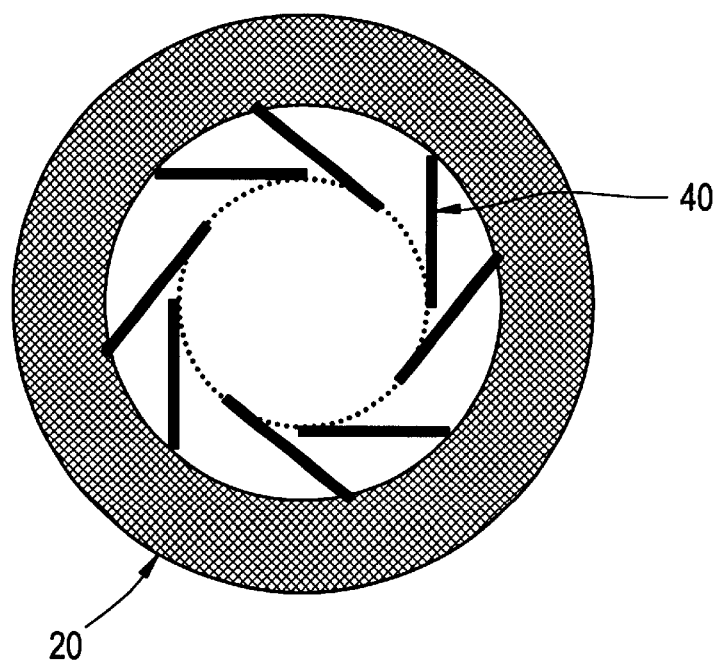
FIG. 2B is a sectional top plan view of the cyclone separator of FIG. 2A taken along line 2—2.

Referring to the drawings, in which like reference numerals are used to refer to the same or similar elements, FIGS. 2A and 2B show a cyclone separator 10 having a coalescing pad surrounding the vanes 40 and inlets 45 at the lower end of the cyclone 10. The coalescing pad 20 and vanes 40 are both positioned below a mounting plate 35 connected to the bottom end of the cyclone inner body 30.

The coalescing pad 20 can be made of a suitable coalescing material for the liquid being separated from the gas stream, such as York DEMISTER Style 326 mesh pad (316 stainless steel wire 0.011"). The coalescing pad 20 provides a large surface area relative to the volume that it occupies.

A preferred configuration for the pad 20 is as a ring surrounding the vanes 40. The ring configuration provides a large exposed surface area relative to the volume occupied by the coalescing pad 20.

Figure 3:
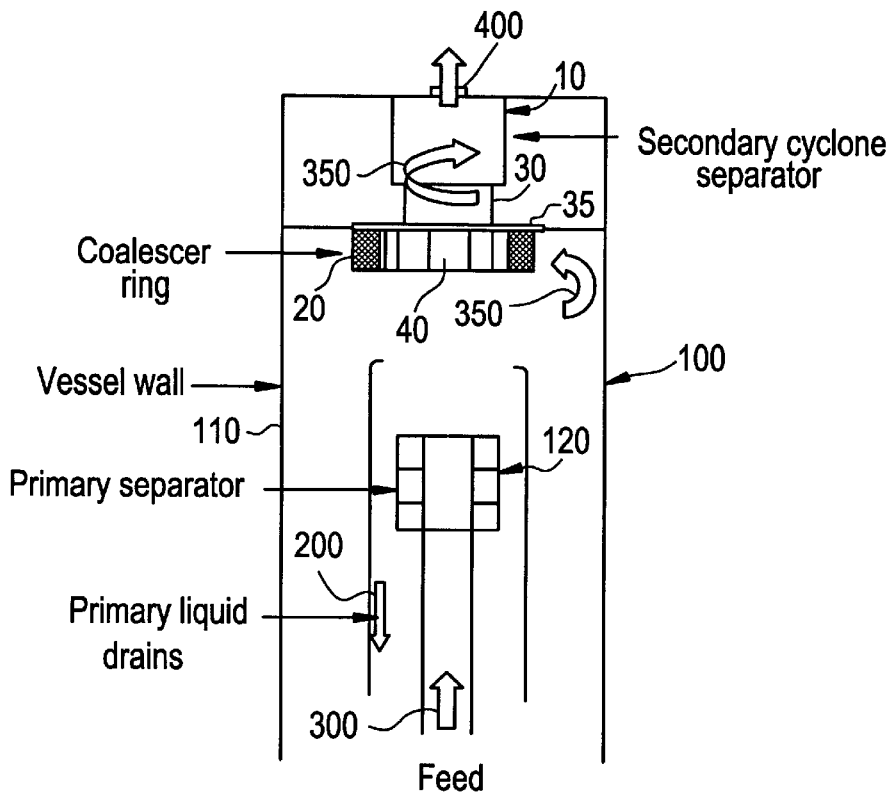
FIG. 3 is a schematic elevational view of a gas-liquid separator system incorporating the second stage cyclone separator.

FIG. 3 shows the cyclone separator 10 of FIG. 2A in a separator system 100. The separator system 100 has a vessel 110 defining a chamber containing two cyclone separators 120, 10 at each end of the chamber. A primary centrifugal separator 120 is positioned near the lower end of the chamber. The primary separator 120 removes a large portion of the liquid 200 from the liquid-gas stream 300 entering the system and drains the liquid 200 to a liquid collection point. The partially separated gas stream 350 exits the primary cyclone and continues up through the chamber to the secondary cyclone separator 10 at the upper end of the chamber.

When the cyclone separator 10 is connected as part of a gas-liquid separator system, such as shown in FIG. 3, gas and liquid droplets 350 from the primary cyclone separator 120 first flow through the coalescing pad 20 which causes the small liquid droplets to coalesce into larger droplets. The gas sweeps the liquid droplets through the coalescing pad, into multiple tangential inlet vanes 40, then into the body 30 of the cyclone separator 10. The mounting plate 35 connects to the side walls of the vessel and prevents the gas stream 350 from by-passing the secondary cyclone separator 10.

The swirl created by the inlet vanes 40 causes the heavier liquid droplets to move towards the wall 30 of the cyclone while the lighter gas phase 400 flows upward through the center of the cyclone and out the exhaust of the separator 10. Testing of this arrangement has shown that centrifugal separation is enhanced due to the larger droplets entering the secondary cyclone 10.

Figure 4:
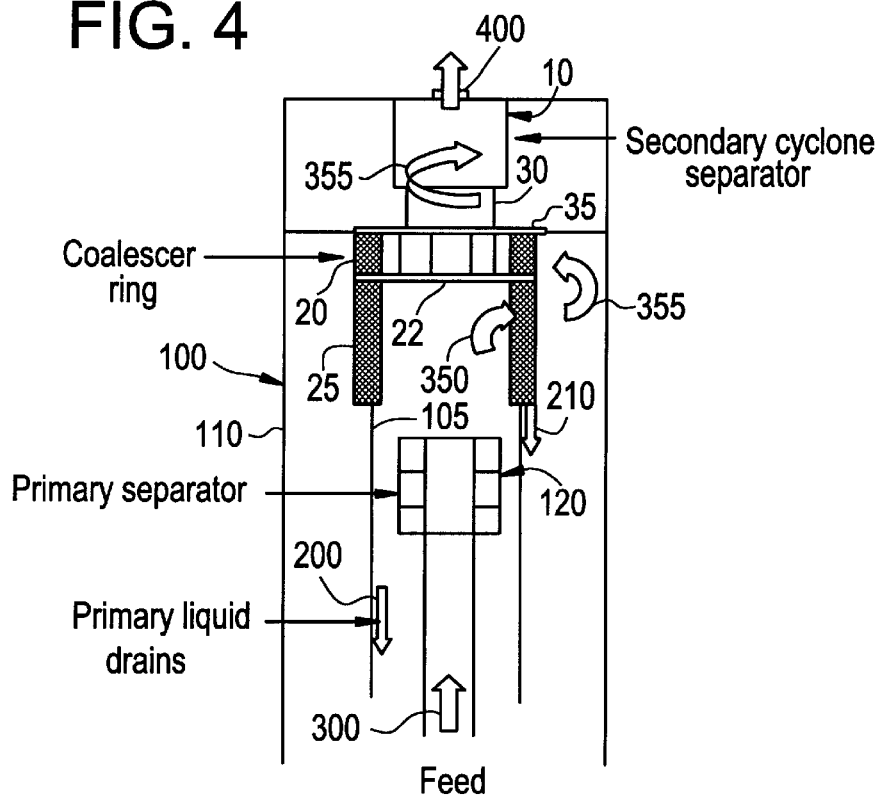
FIG. 4 is a schematic elevational view of a second embodiment of the gas-liquid separator system.

An alternate embodiment of the secondary cyclone separator 10 is shown in FIG. 4. In this embodiment, the secondary cyclone separator 10 has the standard cyclone design as shown in FIGS. 2A–3, with a dual-pass inlet coalescing ring 20, 25. In this arrangement, the ring 20 has an extension 25 which extends below the elevation of the cyclone inlet vanes 40. The extension 25 allows two passes of the gas and entrained droplets through the coalescing material prior to its entering the cyclone separator. An internal wall 105 joins to the bottom of the extension 25 and prevents the gas flow 350 from passing around the extension 25 instead of through it.

The gas and entrained liquid droplets 350 from the primary separator 120 initially flow in a radial outward direction through the extension 25 of the coalescing pad 20, the flow 355 then turns 180° and flows in a radial inward direction through the coalescing pad 20 around vanes 40, to the cyclone separator 10. The separated gas 400 exits the system for use in a desired application.

The initial pass through the coalescing ring extension 25 allows a portion of the larger droplets 210 created by the coalescing material to be separated from the gas stream 350 and to drain out the bottom of the coalescing ring. These liquids 210 fall by gravity into the annular region formed between the primary separator wall 105 and the wall 110 of the pressure vessel. Since the gas velocity in this region is low, the relatively large droplets 210 can fall to the liquid pool without re-entrainment by the gas 355. The mist flow 355 then makes a second pass through the coalescing ring 20 before entering the cyclone 10. Droplet growth caused by the coalescing material enhances the centrifugal separation mechanism in the cyclone 10 and results in further liquid removal. Dry gas 400 exits the top of the cyclone 10.

The dual-pass design extends the operating range of the separator 10 by allowing a higher liquid load from the primary separator 120. Testing with air and water has shown the first pass through the coalescing pad extension 25 can result in a significant quantity of liquid rainout from the coalescing ring 20, 25. Provided this liquid is discharged to a region with low gas velocity, the liquid can be effectively removed from the gas before entering the cyclone 10. Reducing the liquid load on the secondary cyclone 10 also reduces the thickness of the liquid film deposited on the inside wall of the cyclone. This in turn decreases the potential for droplet re-entrainment inside the cyclone 10. Droplet re-entrainment is thought to be a significant contributor to liquid carryover at certain conditions.

The second pass through the coalescing ring results in droplet growth of the fine mist and improved centrifugal separation in the cyclone. On the second pass, the droplets generally do not rainout, i.e., drain axially; rather, they are suspended by the accelerating gas as it enters the cyclone inlet vanes 40. A divider plate 22 is utilized to isolate the two passes. Any liquid rainout that does occur during the second pass will be forced into the cyclone for separation.

The invention combines the favorable attributes of high surface area to volume coalescing materials to enhance the centrifugal separation in a cyclone separator resulting in a high-efficiency gas scrubber. When used in combination with a primary separator, the result is an improved compact gas-liquid separator.

The addition of high surface area to volume coalescing material to the inlet of the secondary cyclone separator provides an increase in liquid removal efficiency with an acceptable increase in pressure drop. This improved performance will allow a separation quality, on the order of 0.1 to 1.0 Gal/MMscf, to be achieved with this equipment. The amount of increased pressure loss is not significant.

This equipment, when used in combination with a high-efficiency primary separator, is more compact than a conventional oil and gas separator that uses mesh pads or vane-type mist eliminators. Typically, this separator will occupy about $1/10^{th}$ the space and will be $1/4^{th}$ the weight of a conventional horizontal separator. With the stated invention, this separator will produce similar oil content in the separated gas as a much larger conventional horizontal separator using a mesh pad or vane-type mist eliminator.

The addition of a dual-pass coalescing ring provides a pre-separation of liquid droplets, followed by droplet coalescence upstream of the secondary cyclone separator. The pre-separation reduces the liquid load on the cyclone, which reduces liquid carryover caused by re-entrainment from the liquid film. The second pass provides droplet coalescence, which results in an increased removal efficiency of the fine droplets.

The advantage of the dual-pass coalescing ring is the increased liquid removal efficiency with an acceptable pressure drop, and the increased range (liquid load) over which the separator can produce a high quality gas stream.

The invention can be used in combination with a high-efficiency primary separator or as a stand-alone cyclonic gas scrubber, depending upon the feed stream liquid load.

When used in combination with a high-efficiency primary separator, the ability to operate at higher efficiency, or lower liquid carryover, provides a competitive advantage for this compact gas-liquid separator.

The increased liquid removal efficiency, due to the combined coalescing material and cyclone separator, may make further application of the product as a suction scrubber for gas compression equipment possible.

While a specific embodiment of the invention has been shown and described in detail to illustrate the application of the principles of the invention, it will be understood that the invention may be embodied otherwise without departing from such principles.

We claim:

1. A method for separating liquids from gases contained in a wellhead fluid in hydrocarbon production systems within a compact area comprising:

passing the fluid through an initial separator means having a first liquid drain means and a first fluid output;

collecting the fluid from the first fluid output;

passing the fluid through a coalescer means having a second fluid output;

collecting the fluid from the second fluid output;

passing the fluid through a secondary separator means having a second liquid drain means and a gas outlet;

removing the liquids from the first liquid drain means and the second liquid drain means; and removing the gases through the gas outlet.

2. A method according to claim 1, wherein the initial separator means comprises a centrifugal separator.

3. A method according to claim 1, wherein the secondary separator means comprises a cyclone separator.

4. A method according to claim 1, wherein the coalescer means comprises a steel wire mesh pad.

5. A secondary cyclone separator for a gas-liquid separation system having a primary centrifugal separator with an exhaust providing a gas-liquid stream which has a large portion of entrained liquid in the gas-liquid stream removed, the secondary cyclone separator comprising:

a cyclone separator having a plurality of inlet vanes at a lower end defining a gas-liquid stream inlet means for accepting the gas-liquid stream from the primary centrifugal separator into the cyclone separator; and a coalescing means surrounding the plurality of inlet vanes.

6. A secondary cyclone separator according to claim 5, wherein the coalescing means is a ring around the plurality of inlet vanes.

7. A secondary cyclone separator according to claim 6, wherein the coalescing means extends past a bottom edge of each of the plurality of inlet vanes.

8. A secondary cyclone separator according to claim 5, wherein the coalescing means is made of steel wire mesh pads.

9. A gas-liquid centrifugal separator system for producing a one-phase, single or multiple component gas, the separator system comprising:

a vessel wall defining a chamber having upper and lower ends;

a primary centrifugal separator at the lower end of the chamber, the primary centrifugal separator having an inlet for a gas containing entrained liquid and an outlet for exhausting a partially separated gas-liquid mixture;

a secondary cyclone separator at the upper end of the chamber having a plurality of vanes at a bottom end of the secondary cyclone separator defining an inlet for the partially separated gas-liquid mixture and an outlet for exhausting the one-phase, single or multiple component gas at a top end of the secondary cyclone; and a coalescing means surrounding the plurality of vanes of the secondary cyclone separator.

10. A separator system according to claim 9, wherein the coalescing means is a ring around the plurality of inlet vanes.

11. A separator system according to claim 10, wherein the coalescing means extends past a bottom edge of each of the plurality of inlet vanes.

12. A separator system according to claim 9, wherein the coalescing means is made of steel wire mesh pads.

13. A separator system according to claim 9, wherein the primary centrifugal separator further comprises an outlet for exhausting a liquid separated from the gas containing entrained liquid and wherein the secondary cyclone separator further comprises an outlet for exhausting a liquid separated from the partially separated gas-liquid mixture.

* * * * *